Dec. 30, 1958     M. J. ANDOR     2,866,309
MOUNTING FOR ROTARY SIDE DELIVERY RAKE
Filed Jan. 31, 1957     2 Sheets-Sheet 1

INVENTOR.
MATT J. ANDOR
BY Victor J. Evans & Co.
ATTORNEYS

Dec. 30, 1958  M. J. ANDOR  2,866,309
MOUNTING FOR ROTARY SIDE DELIVERY RAKE
Filed Jan. 31, 1957  2 Sheets-Sheet 2
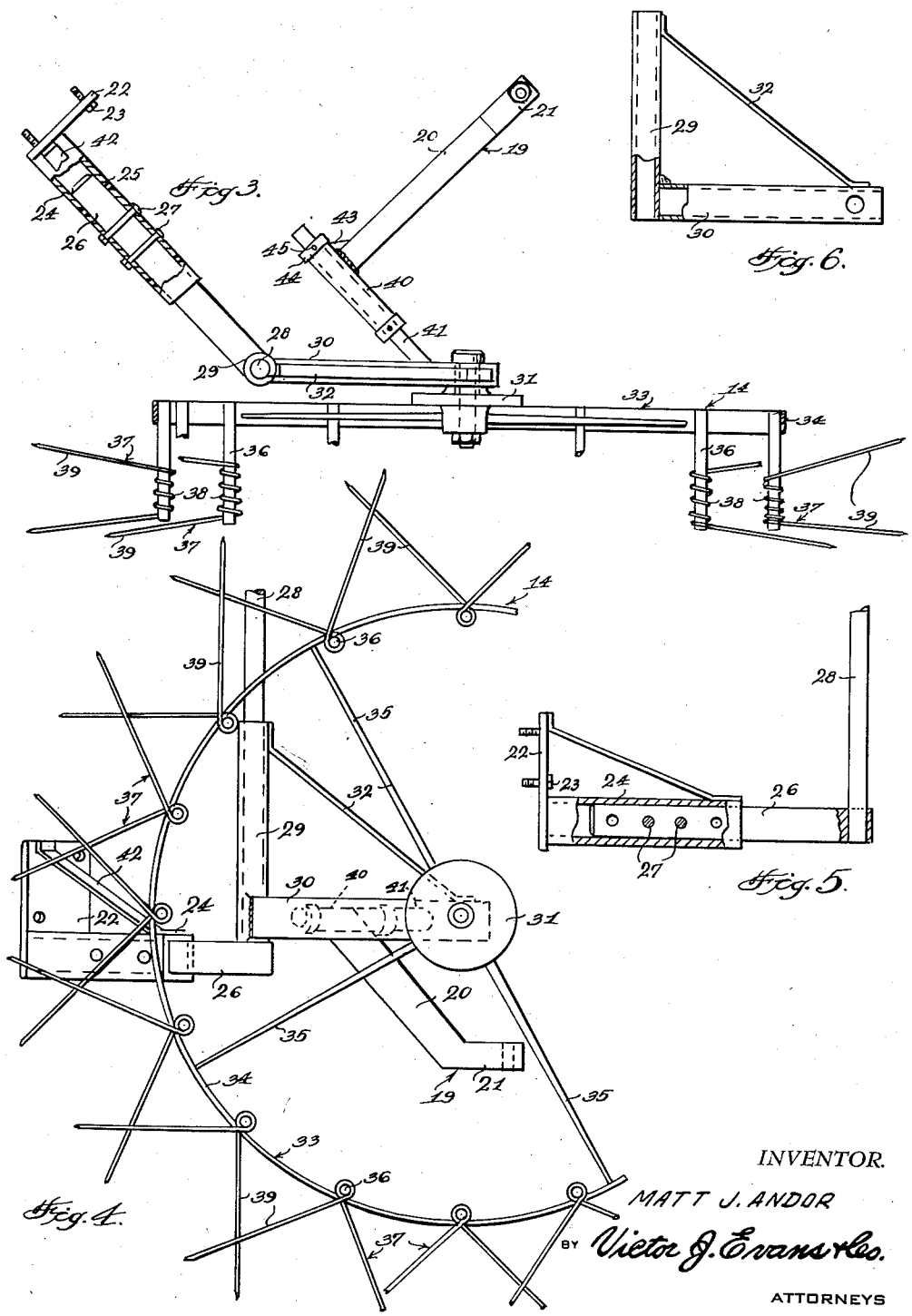
INVENTOR.
MATT J. ANDOR
BY Victor J. Evans & Co.
ATTORNEYS

United States Patent Office 2,866,309
Patented Dec. 30, 1958

2,866,309

MOUNTING FOR ROTARY SIDE DELIVERY RAKE

Matt J. Andor, Lachine, Mich.

Application January 31, 1957, Serial No. 637,434

1 Claim. (Cl. 56—377)

This invention relates to an agricultural implement.

The object of the invention is to provide an agricultural implement which includes a rotary wheel that is adapted to be mounted on a tractor whereby material such as straw or the like can be readily moved or transferred as desired.

A further object of the invention is to provide an agricultural implement which is in the nature of a rotary rake or wheel and wherein the wheel carries a plurality of elements that are adapted to engage straw or other material so that such straw can be readily moved from one location to another, as for example when the straw is being shifted from strawberry plants.

Another object of the invention is to provide an agricultural implement which is extremely simple and inexpensive to manufacture.

Other objects and advantages will be apparent during the course of the following description.

In the accompanying drawings, forming a part of this application, and in which like numerals are used to designate like parts throughout the same:

Figure 3 is an enlarged plan view of the implement showing the implement detached from the tractor, and with parts broken away and in section.

Figure 4 is a side elevational view of the implement shown in Figure 3, and with parts broken away.

Figure 5 is an enlarged fragmentary elevational view illustrating certain constructional details of the apparatus, and with parts broken away and in section.

Figure 6 is an enlarged view illustrating the support member for the wheel, and with parts broken away.

Figure 2:
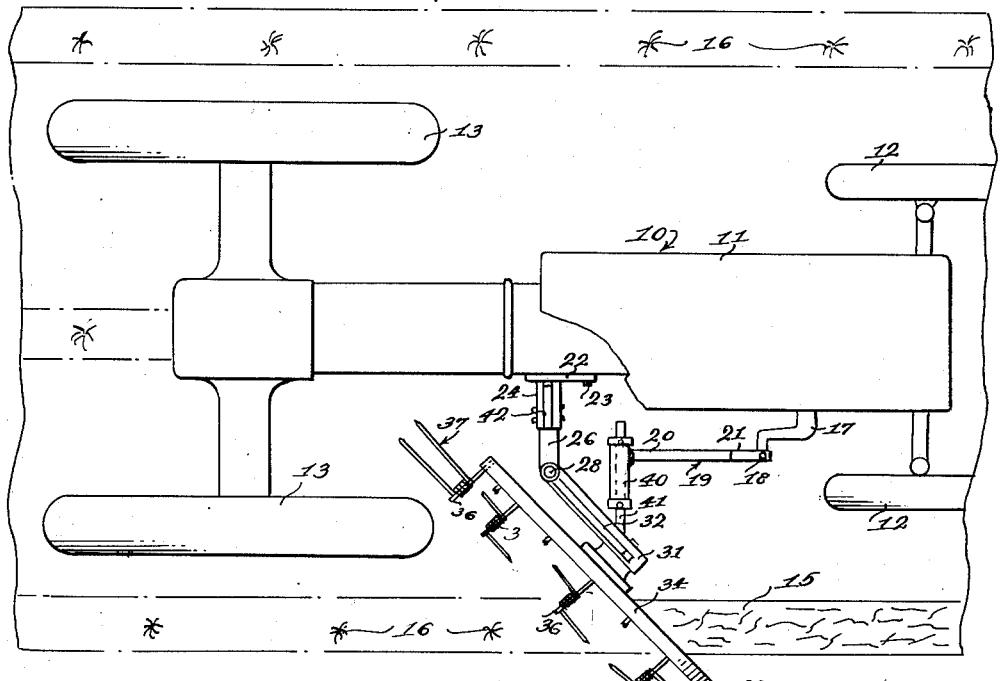
Figure 2 is a top plan view of the present invention.

Referring in detail to the drawings, the numeral 10 indicates a conventional tractor which includes the usual engine 11, front wheels 12 and rear wheels 13. The present invention is directed to an implement 14 which is adapted to be detachably connected to the tractor 10, and the implement 14 is in the nature of a rotary wheel or rake which can be used for transferring various materials from one plate to another, as for example the rake can be used for moving straw such as the straw 15 from strawberry plants 16 as shown in Figure 2.

The numeral 17 designates a hydraulic lift arm which extends outwardly from one side of the tractor 10, and a bar 19 includes an inclined portion 20 and a horizontal portion 21, the horizontal portion 21 being solidly connected to a portion of the lift mechanism 17 solidly through the medium of a bolt 18.

There is further provided a plate or bracket 22 which is detachably connected to one side of the tractor 10 by means of suitable securing elements such as the bolts or screws 23, Figure 3. Extending outwardly from the plate 22 and secured thereto is a horizontally disposed channel member 24 which may be rectangular in cross section. A beam 26 is slidably or adjustably mounted in the channel member 24, and for maintaining the beam 26 immobile in its adjusted positions in the channel member 24, there is provided a plurality of openings 25 in the channel member 24. These openings 25 are adapted to register with corresponding openings in the beam 26 whereby suitable securing elements such as the bolts 27 can be extended through these registering openings.

Extending upwardly from the outer end of the beam 26 is a vertically disposed rod 28, and a tube 29 is rotatably mounted on the rod 28. Extending outwardly from the lower end of the tube 29 is a horizontally disposed support member 30 which carries a hub 31. An inclined brace 32 extends between the upper end of the tube 29 and the outer end of the support member 30 for reinforcing these parts.

Connected to the hub 31 is a rotary wheel or rake which is indicated generally by the numeral 33, and the wheel 33 includes a circular rim 34 and a plurality of spokes 35. Secured to the rim 34 in any suitable manner, as for example by welding, is a plurality of spaced parallel fingers 36, and mounted on each finger 36 is a tine 37. Each tine 37 has the same construction, and the tines may be made of spring metal or the like and each tine includes a coil portion 38 which is circumposed on the fingers 36. Extending outwardly from the coil portion 38 of each tine is a pair of angularly arranged teeth or prongs 39, and these teeth are adapted to engage the material being transferred such as the straw 15 whereby this straw can be removed from the strawberry plants 16, as when the strawberry plants 16 are being uncovered in the spring of the year.

Secured to the upper end of the bar 19 is a sleeve or collar 40, and extending through the sleeve 40 is a tie rod 41 which has an end connected to the support member 30.

Figure 1:
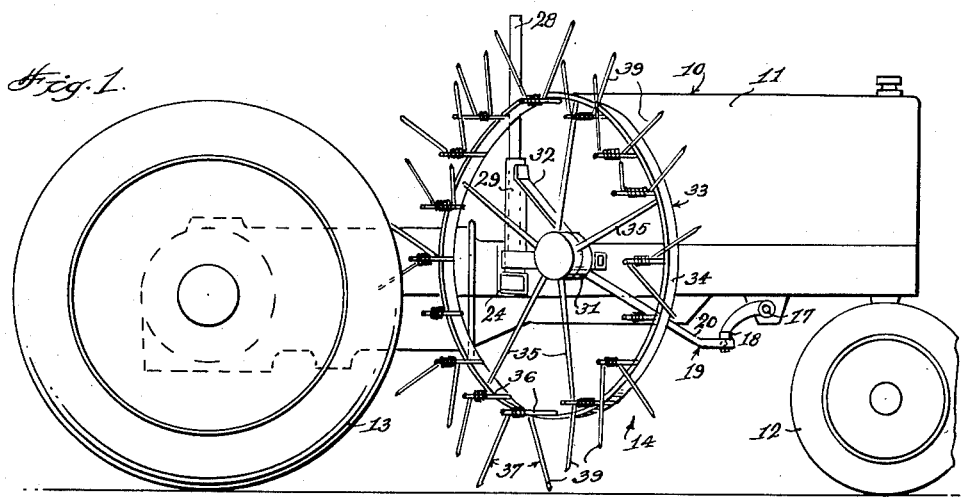
Figure 1 is a side elevational view illustrating the agricultural implement of the present invention mounted on a tractor.

From the foregoing, it is apparent that there has been provided an agricultural implement which is adapted to be mounted on a tractor such as the tractor 10 whereby straw such as the straw 15 can be readily removed from one location to another. In use, with the device mounted on the tractor as shown in Figures 1 and 2, as the tractor moves along the field as for example along a field or area in which strawberry plants 16 are positioned, the rake or wheel 33 will turn and the teeth 39 will move the straw 15 so that the plants 16 will be uncovered, and this straw 15 may be moved to an area which is in the path of the rear wheel 13 of the tractor, as for example as shown in Figure 2. The tines 37 are made of spring metal so that damage to the parts will be prevented, and due to the provision of the tube 29 which is rotatably mounted on the rod 28, it will be seen that the angular position of the rake 33 can be adjusted as desired. By actuating the hydraulic arm 17 by the usual mechanism on the tractor, the position of the rotary rake 33 can be adjusted as desired. The rake 33 includes the rim 34, and the rake or wheel is rotatably mounted on the hub 31 which is carried by the outer end of the support member 30, the inner end of the support member 30 being secured to the lower end of the tube 29. When the device is not being used, the bolts or screws 23 can be readily removed and the bolt 18 can be removed so that the entire implement can be easily detached from the tractor so as to permit the tractor to be used for any other desired purpose.

The implement is especially suitable for use in moving straw from one place to another, as for example when straw is being moved from the top of a row of strawberry plants whereby such straw can be placed in between the rows, as for example as shown in Figure 2. Thus, the hub 31 may be provided with ball bearings not shown so as to insure that the rake 33 will turn freely and easily. The parts can be made of any suitable material and in any desired shape or size. The rake 33 is preferably set at an angle of approximately 45 degrees with respect to the longitudinal axis of the tractor. The height of the implement can be adjusted by the hydraulic mechanism and as shown in Figure 2, the rear wheel of the tractor runs over the straw after the straw has been transferred from the row of strawberry plants. The teeth 39 engage the straw as the tractor moves along the field so as to deposit the straw in the desired position and by having the rear wheel 13 of the tractor run over the straw, the straw will be packed so that the wind will not blow the straw away. Due to the provision of the rotating wheel 33, there will be no damage or injury to the strawberry plants by the teeth 39.

The hydraulic mechanism 17 is used for raising the rake, so that the wheel or rake can be adjusted to different elevations.

The apparatus of the present invention further includes a brace 42 which extends between the plate 22 and the channel member 24 and is secured thereto. A truss plate 43 extends between the bar 19 and sleeve 40 and is secured thereto, there being a collar 44 on the tie rod 41, and a set screw 45 extends through the collar 44. The arm 17 is a universal mounting member such as is found on Farmall types of tractors, and the arm or member 17 moves up and down and since the bar 19 is secured to the arm 17, it will be seen that the rake wheel can be moved up or down, through the medium of a hydraulic action. The tie rod 41 maintains the rake wheel at the desired or proper angle and by loosening the collar 44, the tie rod 41 can be moved in or out of the sleeve 40. The adjustable mounting of the beam 26 in the channel member 24 permits the rake wheel to be adjusted for row widths, towards and away from the tractor.

On those tractors which have a different construction from the Farmall type of tractor, different types of mounting members can be used or installed and if desired an additional hydraulic cylinder can be provided to facilitate the movement. The number of teeth and spokes on the rake can be varied as desired, and as previously described, there is a brace 42 which extends between the plate 22 and member 24. The truss plate 43 helps to strengthen or reinforce the various parts. Furthermore, the apparatus of the present invention can also be used for moving straw back onto strawberry rows, as well as uncovering strawberry plants or removing the straw from the strawberry rows. This is important and advantageous especially when the strawberries begin to bloom and frost is likely. Thus, in the event of frost warnings, and without changing the arrangement of the parts, the operator or user can readily transfer the straw back onto the strawberry rows whereby the blossoms will be protected from freezing weather conditions. Furthermore, the straw can be quickly and easily handled so that a great amount of territory can be covered in a short period of time.

I claim:

In combination a tractor including rear wheels and a front end, an arm extending outwardly from said tractor adjacent the front end thereof, a bar embodying an inclined portion and a horizontally disposed portion, said bar including an upper end, the horizontally disposed portion of said bar being connected to said arm, a plate secured to one side of said tractor and spaced rearwardly from said arm, a rectangular channel member extending outwardly from said plate and secured thereto, a beam adjustably mounted in said channel member, securing elements connecting said beam to said channel member, a rod extending upwardly from the outer end of said beam and secured thereto, a tube rotatably surrounding said rod and including a lower end, a horizontally disposed support member extending outwardly from the lower end of said tube and secured thereto, said support member having an outer end, an inclined brace extending between said tube and support member, a hub carried by the outer end of said support member, a rotary rake rotatably connected to said hub, said rake including a plurality of spokes and a circular rim, a plurality of spaced parallel fingers extending outwardly from said rim, tines mounted on said fingers and each tine including a coil spring portion circumposed on said finger, and a pair of angularly arranged teeth extending outwardly from each coil spring portion of each tine, a sleeve secured at the upper end of said bar, and a tie rod mounted in said sleeve and connected to said support member, the teeth of the rake serving to transfer or move straw into the path of a rear wheel of the tractor so that the rear wheel of the tractor will run over the straw and pack the straw down, and hydraulic means for raising and lowering the rake.

References Cited in the file of this patent

UNITED STATES PATENTS

| | | |
|---|---|---|
| 2,459,961 | Pollard | Jan. 25, 1949 |
| 2,502,769 | Warnke | Apr. 4, 1950 |
| 2,532,652 | Wray | Dec. 5, 1950 |